United States Patent [19]

Brain et al.

[11] 3,868,405

[45] Feb. 25, 1975

[54] NAPHTHYLENE DERIVATIVES

[75] Inventors: Edward George Brain, Leigh; John Christopher Hanson, Newdigate; Minoo Dossabhoy Mehta, Wimbledon, all of England

[73] Assignee: Beecham Group Limited, Brentford, Middlesex, England

[22] Filed: July 1, 1971

[21] Appl. No.: 159,037

Related U.S. Application Data

[63] Continuation of Ser. No. 639,023, May 17, 1967, abandoned.

[52] U.S. Cl. ........ 260/473 F, 260/311, 260/488 CD, 260/520, 260/586 R, 260/613 D, 260/619 F, 260/999

[51] Int. Cl. ............................................. C07c 69/88

[58] Field of Search ......................... 260/520, 473 F

[56] References Cited
UNITED STATES PATENTS 3,649,678    3/1972    Fusco et al. ........................ 260/520

Primary Examiner—Lorraine A. Weinberger
Assistant Examiner—L. A. Thaxton

[57] ABSTRACT

Novel naphthylcyclopentanone derivatives are described which are useful as intermediates for and as pharmacological agents. Representative compounds are 3-(6'-methoxy-2'-naphthyl)-2-methylcyclopentanone-2-acetic acid, the cyclopentanol analog, their methyl and other alkyl esters, acid addition salts thereof, their racemic and optically active forms.

3 Claims, No Drawings

NAPHTHYLENE DERIVATIVES

This application is a continuation of Ser. No. 639,023, filed May 17, 1967 and now abandoned.

This invention relates to new naphthylcyclopentanone derivatives, which have useful pharmacological properties and are valuable intermediates.

Accordingly the present invention provides naphthylcyclopentanone derivatives of the general formula:

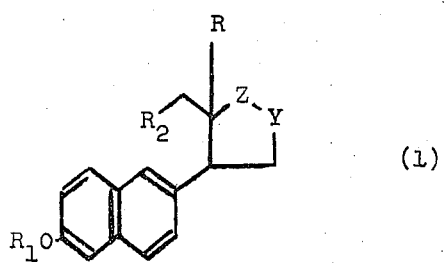

(I)

in which R is an alkyl group having 1 – 6 carbon atoms; $R_1$ is a hydrogen atom or an alkyl or dialkylaminoalkyl group; $R_2$ is a carboxy, carboxyalkyl, carboxydialkylaminoalkyl, hydroxymethyl, methoxymethyl or acyloxymethyl group; Z is CO which may be thioketalised, CHOH, CHOAc, CHOCH$_3$, C(OH)C:CH or C:NOH, Ac being an acyl group; Y is CH$_2$, CO, C:NOH, C:CHOH, C:CHSR$_3$ or C:CHNR$_4$R$_5$, in which $R_3$ is an alkyl group and $R_4$ and $R_5$ are the same or different alkyl or aryl groups; and acid-addition salts of those compounds having basic groups.

The compounds of this invention can exist in two racemic forms, each of which can be resolved into the d- and l- forms by the usual methods, and it is to be understood that all these forms are included in the invention.

The invention also provides a process for preparing the compounds of formula (I), which process comprises alkylating a compound of the formula:

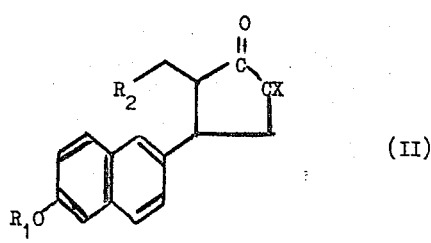

(II)

to introduce the angular alkyl group R, wherein X is a protecting group, and then before or after removal of group X, if desired replacing substituents $R_1$ and/or $R_2$ in known manner, and if desired, thioketalising the 1-keto group to other groups Z in known manner and after removal of group X if desired introducing the other groups Y, and if desired forming acid addition salts of those compounds having basic groups.

Preferably the alkylation is effected by using an alkyl halide in presence of an alkali metal alkoxide, especially potassium t-butoxide.

Preferably in compound (II) during the alkylation $R_2$ is a carboxyalkyl group and the protecting group X is benzylidene, furfurylidene, CHSR$_3$ or CHNR$_4$R$_5$, especially the CHN(CH$_3$)(C$_6$H$_5$) group, and this may be converted to a compound (I) in which Y is a CH$_2$ group by vigorous hydrolysis, for example with aqueous sodium hydroxide in a higher boiling alcohol such as methoxyethanol. During the hydrolysis group $R_2$ when a carboxyalkyl group may be converted to a carboxy group, which group may be subsequently esterified, for example by using a diazoalkane.

Products having other substituents may be prepared in known way, for example, when $R_1$ is an alkyl group, dealkylation gives compounds in which $R_1$ is a hydrogen atom and these compounds may be reacted with an alkyl or dialkylaminoalkyl halide.

Similarly compounds in which Z is a CO group may be treated by known methods to introduce other substituents.

The starting compounds of formula (II) may be prepared by treating a compound of the formula:

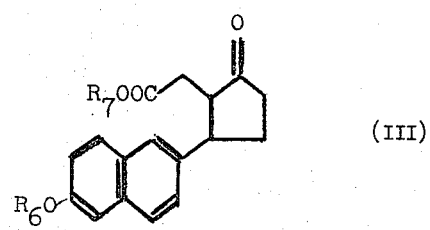

(III)

in which $R_6$ and $R_7$ are alkyl groups, with an alkyl formate and alkali metal alkoxide to give a compound of the formula:

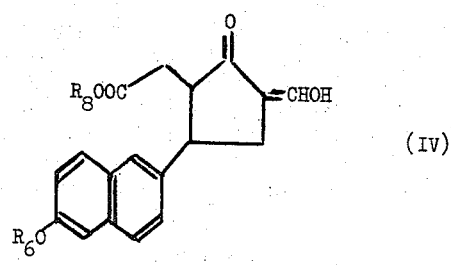

(IV)

wherein $R_8$ is a hydrogen atom or an alkyl group, and then introducing group X in the 5-position of the cyclopentanone ring and when $R_8$ is a hydrogen atom, esterifying the COOH group to form a carboxyalkyl group. Suitably, the compound (IV) is reacted with a s-amine $R_4R_5$NH (wherein at least one of $R_4$ and $R_5$ is aryl) to form the protecting group = CHNR$_4$R$_5$ Reactions used to change substituents in compounds (I) include:

a. dealkylation with pyridine hydrochloride to give compounds in which $R_1$ is a hydrogen atom, followed by alkylation or dialkylaminoalkylation,
b. reduction of group Z = CO to give Z = CHOH,
c. reduction of $R_2$ = COOH to $R_2$ = CH$_2$OH,
d. reaction of group Z = CO with a Grignard reagent, followed by hydrolysis.

The following Examples 3 to 17 illustrate the invention.

EXAMPLE 1

A solution of methyl 3-(6'-methoxy-2'-naphthyl)-cyclopentanone-2-acetate (21.4 g) (trans ester used) in dry benzene (80 ml.) was added during 1 hour to a stirred, ice-cooled suspension of methanol-free sodium methoxide (21.7 g.) in dry methyl formate (24 g.) and dry benzene (250 ml.) and then allowed to reach 20°C with stirring. After 16 hours at this temperature the suspension was cooled and shaken with ice cold 5N. sulphuric acid (100 ml.). The benzene layer was washed with water (100 ml.), extracted with 10 percent sodium hydroxide (80 ml.) and then with water (100 ml.). The aqueous alkaline extracts were acidified with 5N. hydrochloric acid (50 ml.), and the crude 5-formyl-3-(6'-methoxy-2'-naphthyl)cyclopentanone-2-acetic acid was filtered off and dried to a fine pale fawn powder (20.2 g.), U.V. (EtOH) $\lambda$max. 233$\mu$, 273$\mu$; (-72,000, 17,000, (NaOH/EtOH) $\lambda$max. 233$\mu$, 312$\mu$; (-72,000, 26,000). This product was refluxed in benzene (150 ml.) with N-methylaniline (17 ml.) for 0.5 hr. with continuous removal of the water formed by means of a Dean and Stark head. The reaction liquor was cooled and the crystals of 5-N-methylanilinoformyl-3-(6'-methoxy-2'-naphthyl)cyclopentanone-2-acetic acid (16.6 g; 58 percent) were filtered off and washed with benzene (10 ml.), m.p. 193° – 194°C; U.V. (in EtOH) $\lambda$max. 231$\mu$, 339 $\mu$; (-99,000,33,000)(Found: C, 75.2; H 5.93; N, 3.13; $C_{26}H_{25}NO_4$ requires C, 75.18; H, 6.02; N, 3.37 percent). In some experiments methyl 5-formyl-3-(6'-methoxy-2'-naphthyl)-cyclopentanone-2-acetate was obtained, which on reaction with N-methyl-aniline gave the ester described in Example 2.

EXAMPLE 2

A solution of the acid of Example 1 (16.6 g) in tetrahydrofuran (300 ml.) was treated with diazomethane (from nitrosomethylurea, 8 g) in ether (400 ml.) and stirred for 20 hours. After removal of the solvent, the residue was recrystallised from methanol (400 ml.) to give methyl 5-N-methylanilinoformyl-3-(6'-methoxy-2'-naphthyl)cyclopentanone-2-acetate (15.2 g. 89 percent), m.p. 138° – 140°C (Found: C, 75.4; H, 6.37; N, 3.18; $C_{27}H_{27}NO_4$ requires C, 75.51; H, 6.33; N, 3.26 percent).

EXAMPLE 3

A solution of the ester of Example 2 (125 g) in hot dry tetrahydrofuran (450 ml.) was cooled to 20°C and added simultaneously with methyl iodide (120 g., excess) to a solution, obtained by dissolving potassium (24 g.) in dry t-butanol (350 ml.) and dry tetrahydrofuran (350 ml.) at −10°C - 0°C under nitrogen. The reaction mixture was kept at 0°C for 1 hr. and allowed to reach room temperature during a further 1 hour. The solvents were removed in vacuo at approx. 20°C. Ether (500 ml.), water (200 ml.) and 1N sodium bicarbonate solution (500 ml.) were added, shaken thoroughly then filtered, giving 117 g. of solid. The ether filtrate was washed with water and evaporated, then the residue was crystallised from methanol.

The combined solids were Soxhlet-extracted with methanol (500 ml.). On cooling, the methanolic extract deposited methyl 5-methylanilinoformyl-3-(6'-methoxy-2'-naphthyl)-2-methyl-cyclopentanone-2-acetate (96 g., 79 percent), m.p. 164° – 165°C. (Found: C, 75.6; H, 6.79; N, 3.08; $C_{28}H_{29}NO_4$ requires: C, 75.85; H, 6.59; N, 3.16 percent).

EXAMPLE 4

A solution of methyl 5-methylanilinoformyl-3-(6'-methoxy-2'-naphthyl)-2-methylcyclopentanone-2-acetate (4.77 g) in methoxyethanol (30 ml.) was refluxed with 40 percent aqueous sodium hydroxide solution (20 ml.) for 3 hours. The mixture was cooled, diluted with water (100 ml.), acidified with 5N. hydrochloric acid (40 ml.), extracted with ether (2 × 100 ml.) and the ether layer was washed with water (2 × 30 ml.). The ether was distilled off to leave a crystalline residue (3.42 g), which was recrystallised from benzene (100 ml.) to give 3-(6'-methoxy-2'-naphthyl)-2-methylcyclopentanone-2-acetic acid (2.74 g., 81 percent), m.p. 151° – 153°C (Found: C, 73.2; H, 6.76; $C_{19}H_{20}O_4$ requires C, 73.06; H, 6.45).

EXAMPLE 5

A solution of 3-(6'-methoxy-2'-naphthyl)-2-methylcyclopentanone-2-acetic acid (2 g.) in tetrahydrofuran (50 ml.) was treated with diazomethane (from nitrosomethylurea, 2 g.) in ether (200 ml.) for 2 hours. After removal of the solvent, the residue was distilled in vacuo (b.p. ca. 130°/10$^{-6}$ mm.) to give methyl 3-(6'-methoxy-2'naphthyl)-2-methylcyclopentanone-2-acetate (1.83 g. 90 percent), as a colourless viscous oil. (Found: C, 73.56; H, 6.91; $C_{20}H_{22}O_4$ requires C, 73.60; H, 6.79 percent).

EXAMPLE 6

3(6'-Methoxy-2'-naphthyl)-2-methylcyclopentanone-2-acetic acid (6g.) was dissolved in 5 percent sodium hydroxide solution (250 ml.), sodium borohydride (3 g.) was added and the mixture was stirred at room temperature for 18 hours. Acetic acid (30 ml.) was added dropwise to decompose the complex and excess borohydride, and then the solution was strongly acidified with concentrated hydrochloric acid. It was extracted with ethyl acetate (3 × 75 ml.) and the combined organic extracts were washed with saturated sodium bicarbonate solution (3 × 75 ml.), then with brine (50 ml.), dried ($Na_2SO_4$) and evaporated. The residue was crystallised from ethyl acetate to give 3-(6'-methoxy-2'-naphthyl)-2-methylcyclopentanol-2-acetic acid cis-lactone (3.3g., 58 percent), m.p. 159° – 160°C (Found: C, 77.19; H, 6.91, $C_{19}H_{20}O_3$ requires C, 77.00; H, 6.80 percent); i.r. (5 percent solution in $CHCl_3$) band at 1760 cm$^{-1}$ (lactone carbonyl). The n.m.r. showed a singlet at 8.55$\tau$ (angular methyl/group) and a multiplet at 5.2 – 5.4$\tau$ (proton adjacent to lactone ring).

The above-mentioned sodium bicarbonate extracts were acidified with dilute hydrochloric acid and extracted with ethyl acetate (3 × 30 ml.). The combined organic extracts were washed with brine (20 ml), dried ($Na_2SO_4$) and evaporated. The residue was crystallised fron benzene to give 3-(6'-methoxy-2'-naphthyl)-2-methylcyclopentanol-2-trans acetic acid (1g., 17 percent), m.p. 156° – 158°C; i.r. (2 percent solution in $CHCl_3$) bands at 1720 cm$^{-1}$ (acid carbonyl), 3660 cm$^{-1}$ and 3570 cm$^{-1}$ (carbonyl OH). The n.m.r. showed a singlet at 8.81$\tau$ (angular methyl group) and a multiplet at 5.5 – 5.7$\tau$ (proton adjacent to OH group).

EXAMPLE 7

Lithium aluminium hydride (0.45 g., 2 equivs) was stirred with dry ether (150 ml.) for 0.5 hour, then a solution of 3-(6'-methoxy-2'-naphthyl)-2-methylcyclopentanol-2-acetic acid cis-lactone (3.5 g.)

in tetrahydrofuran (150 ml.) was added dropwise to the suspension. The resulting mixture was refluxed for 2 hours and cooled in ice. The complex was decomposed by the alternate additions of water and 20 percent sodium hydroxide solution until a granular solid resulted. The solution was decanted, dried ($Na_2SO_4$) and evaporated to dryness. The residue was crystallised from ethyl acetate to give cis-2-(2'-hydroxyethyl)-3 (6'-methoxy-2'-naphthyl)-2-methylcyclopentanol (2.8g., 79 percent), m.p. 158° – 160°C (Found C, 76.12; H, 8.31; $C_{19}H_{24}O_3$ requires C, 75.98; H, 8.00 percent), i.r. (5 percent solution in $CHCl_3$) bands at 3600 cm$^{-1}$ and 3300cm$^{-1}$ (OH groups). The n.m.r. showed a singlet at 8.90τ (angular methyl group) and a multiplet at 6.08 – 6.22τ (proton attached to cyclopentanol OH overlaid by methoxyl signal).

EXAMPLE 8

3-(6'-Methoxy-2'-naphthyl)-2-methylcyclopentanol-2-trans acetic acid (1 g.) was reduced with lithium aluminium hydride (0.18 g.) by the method of Example 7. The product was recrystallised from ethyl acetate to give crystals of trans-2(2'-hydroxyethyl)-3-(6'-methoxy-2'-naphthyl)-2-methylcyclopentanol (0.6 g., 63 percent), m.p. 138° – 140°C; i.r. (5 percent solution in $CHCl_3$) bands at 3600cm$^{-1}$ and 3480 cm$^{-1}$ (OH groups). The n.m.r. showed a singlet at 8.90τ (angular methyl group) and a multiplet at 5.7 – 5.95τ (adjacent to cyclopentanol OH).

EXAMPLE 9

To 2-(2'-Hydroxyethyl)-3-(6'-methoxy-2'-naphthyl)-2-methyl-cyclopentanol (0.3g) in dry dichloromethane (20 ml.) was added anhydrous aluminium chloride (ca. 0.5g) and the ice-cooled mixture was treated dropwise with dry solution of diazomethane in ether with stirring until the yellow colour persisted, then the mixture was stirred for a further 0.5 hour. It was washed with dilute hydrochloric acid (20 ml.), 10 percent sodium carbonate solution (20 ml.), water (20 ml.) and brine (20 ml.), dried ($MgSO_4$), and evaporated.

The product was chromatogrammed on two 40 × 20 cm. silica gel GF$_{254}$ plates (1 mm. thickness) using 40 percent ethyl acetate in petrol (b.p. 60° – 80°C) for developing. The main zone was eluted with ether, which was evaporated to give 1-methoxy-2-(2'-methoxyethyl)-3-(6'-methoxy-2'-naphthyl)-2-methylcyclopentane (0.256g., 29 percent). On crystallisation from petrol at low temperature the m.p. was 72° – 74°C (Found: C, 76.70; H, 8.65; $C_{21}H_{28}O_3$ requires C, 76.78; H, 8.59 percent). N.m.r. showed singlets at 8.94τ (angular methyl group), 6.98τ, 6.64τ (aliphatic methoxy groups) and 6.13τ (aromatic methoxy group).

EXAMPLE 10

To an ice-cooled solution of 2-(2'-hydroxyethyl)-3(6'-methoxy-2'-naphthyl)-2-methylcyclopentanol (0.5g) in pyridine (2.5 ml.) was added acetic anhydride (0.7g) and the mixture was allowed to stand at room temperature for 7 hours. It was poured into ice-cold dilute hydrochloric acid (25 ml.), and extracted with ether (3 × 25 ml.). The organic extracts were washed with sodium bicarbonate solution (25 ml.) water (25 ml.) and brine (25 ml.), dried ($MgSO_4$) and evaporated to leave 1-acetoxy-2-(2'-acetoxyethyl)-3-(6'-methoxy-2'-naphthyl)-2-methylcyclopentanone as an oil (0.63 g. 99 percent) (Found: C, 71.91; H, 7.50; $C_{23}H_{28}O_5$ requires C, 71.86; H, 7.34 percent), i.r. (5 percent solution in $CCl_4$) band at 1740 cm$^{-1}$ (acetate carbonyl) and a strong band at 1380 cm$^{-1}$ (acetate methyl.) The n.m.r. showed singlets at 8.86ρ (angular methyl), 8.12τ and 7.91τ (acetate methyls) and a multiplet at 4.9 – 5.15τ (proton adjacent to cyclopentyl acetate group).

EXAMPLE 11

3-(6'-Methoxy-2'-naphthyl)-2-methylcyclopentanone-2-acetic acid (10.4 g) was heated with freshly distilled dry pyridine hydrochloride (24 g) at 180°-200°C. for 2 hours, cooled and dissolved by shaking with N-hydrochloric acid (250 ml.) and ether (200 ml.) The ether layer was extracted with 1 N.aqueous sodium bicarbonate (2 × 50 ml) and water (2 × 50 ml.).

The sodium bicarbonate extract was acidified and extracted with ether, which on evaporation and crystallisation from ethyl acetate gave 3-(6'-hydroxy-2'-naphthyl)-2-methylcyclopentanone-2-acetic acid (7.1 g., 71 percent), m.p. 224°-225°C (Found: C, 72.62; H, 6.07; $C_{19}H_{18}O_4$ requires C, 72.47; H, 6.08 percent).

EXAMPLE 12

The acid from Example 11 (6.2 g) was treated with sodium borohydride (2.4 g) as described in Example 6. The products were dissolved in ethyl acetate and extracted with: (1) aqueous sodium bicarbonate to give 3-(6'-hydroxy-2'-naphthyl)-2-methylcyclopentanol-2-trans-acetic acid (7 percent) on acidification, m.p. 169°-170°C; (2) aqueous sodium hydroxide to give 3-(6'-hydroxy-2'-naphthyl)-2-methylcyclopentanol-2-acetic acid cis-lactone (70 percent), crystallised from ethanol-tetrahydrofuran, m.p. 224°C. The lactone was then reduced with lithium aluminium hydride as described in Example 7. The product was crystallised from chloroform, then ethyl acetate to give cis-2-(2'-hydroxyethyl)-3-(6'-hydroxy-2'-naphthyl)-2-methylcyclopentanol (50 percent), m.p. 182° – 185°C.

EXAMPLE 13

Methyl 3-(6'-Methoxy-2'-naphthyl)-2-methylcyclopentanone-2-acetate (7.02 g.), ethanedithiol (7.ml.), dry ether (35 ml.) and boron trifluoride etherate (7 ml.) were thoroughly mixed and allowed to stand for 24 hours at 20°C. 5 percent Sodium hydroxide was added cautiously with cooling, and the ether solution was thoroughly washed with 5 percent sodium hydroxide (3 × 50 ml.) and water (3 × 50 ml.). The ether solvent was evaporated and the residue crystallised from ethanol (150 ml.) to give methyl 3-(6'-methoxy-2'-naphthyl)-2-methyl-cyclopentanone-2-acetate ethanadethiol ketal (5.23 g., 60 percent), m.p. 92.5°C. (Found: C, 65.31; H, 6.47; S, 16.3 $C_{22}H_{28}O_3S_2$ requires C, 65.62; H, 6.51; S, 15.9 percent).

The thioketal ester (2.01 g.) in dry tetrahydrofuran (20 ml.) was added to a suspension of lithium aluminium hydride (0.5 g) in dry ether (20 ml.) and dry tetrahydrofuran (20 ml.), then refluxed for 2 hours. The solvent was removed in vacuo, ether (50 ml.) was added, followed cautiously by water (30 ml.) and 5 N.hydrochloric acid (20 ml.) The ether layer was washed with water (2 × 20 ml.) and the solvent removed to give crude 2-(2'-hydroxyethyl)-3-(6'-methoxy-2'-naphthyl)-2-methylcyclopentanone ethanedithiol ketal (1.80 g., 95 percent). I.r. showed absence of carbonyl frequency and presence of hydroxy bands at 3600 cm⁻¹.

This dithioketal (1.8 g) was refluxed in acetone (50 ml.) and water (5 ml.) with mercuric chloride (2.0 g.) and cadmium carbonate (2.0 g.) for 20 hours. The acetone solvent was distilled off, the residue suspended in water (50 ml.) and extracted with ether (6 × 50 ml.). The ether was distilled to leave a residue, which was crystallised from benzene (30 ml.) to give 2-(2'-hydroxyethyl)-3-(6'-methoxy-2'-naphthyl)-2-methyl-cyclopentanone (0.89 g., 62 percent) m.p. 129°–130°C. (Found: C, 76.79; H, 7.48; $C_{19}H_{22}O_3$ requires C, 76.5; H, 7.42 percent).

EXAMPLE 14

Tetrahydrofuran (75 ml.) was saturated with acetylene at room temperature for 0.5 hour then, with stirring and bubbling of acetylene through the solution, a molar solution of ethylmagnesium bromide in tetrahydrofuran (75 ml.) was added during 0.5 hour. Ice-cooling was then applied and a solution of 3-(6'-methoxy-2'-naphthyl)-2-methylcyclopentanone-2-acetic acid (2 g.) in tetrahydrofuran (25 ml.) was added during 0.5 hour. Passage of acetylene was maintained at 0°C for a further 2 hours, then the mixture was allowed to reach room temperature. Most of the solvent was distilled off in vacuo and the residue was treated cautiously with 5N-sulphuric acid (75 ml.). The mixture was extracted with ether (3 × 25 ml.) and the ether extracts were evaporated to dryness. The residue was stirred with 1.5 percent aqueous sodium carbonate (50 ml.) for 3 hours, the resulting sodium salt was filtered off and washed with ethyl acetate (2 × 50 ml.). It was then dissolved in water, acidified with dilute hydrochloric acid and the precipitate which formed was filtered off and recrystallised from ethyl acetate. 1-Ethynyl-3-(6'-methoxy-2'-naphthyl)-2-methylcyclopentanol-2-transacetic acid (1.5 g. 70 percent) was obtained as colourless crystals, m.p. 154° – 156°C (Found: C, 74.11; H, 6.66; $C_{21}H_{22}O_4$ requires C, 74.15; H, 6.49 percent); i.r. (3 percent solution in $CHCl_3$) bands at 3470 cm⁻¹ (OH); 3280 cm⁻¹; (C = CH); 1690 cm⁻¹. (Carbonyl C=O) with a broad absorbance at 3200~2400⁻¹ (carboxyl OH). N.m.r. bands [in $(CD_3)_2CO$] at 8.66τ (angular methyl) and 6.92τ (C ≡ CH)

The ethyl acetate used to wash the sodium salt was dried ($MgSO_4$) and evaporated. The residue was crystallised from ethyl acetate to give 1-ethynyl-3-(6'-methoxy-2'-naphthyl)-2-methyl-cyclopentanol-2-acetic acid cis-lactone (0.3 g., 15 percent), m.p. 173° – 175°C, having i.r. (5 percent solution in $CHCl_3$) bands at 3300 cm⁻¹ (C ≡ CH), 1770 cm⁻¹. (lactone carbonyl).

EXAMPLE 15

Methyl 3-(6'-methoxy-2'-naphthyl)-2-methylcyclopentanone-2-acetate (1.25 g.) was dissolved in dry t-butanol (25 ml.) and added to a solution obtained by dissolving potassium (1.0 g.) in dry t-butanol (50 ml.). Amyl nitrite (6 ml.) was added and the mixture was stirred for 2 hours, then the solvent was removed in vacuo at 20°. Ether (50 ml.) and N-hydrochloric acid (50 ml.) were added, the ether layer was extracted with N-sodium bicarbonate solution and the sparingly soluble sodium salt was salted out from the aqueous solution with sodium chloride. It was then filtered off, and dissolved by shaking with ether and dilute hydrochloric acid, the ether solvent was distilled off, and the residue crystallised from 25 percent aqueous methanol to give 3-(6'-methoxy-2'-naphthyl)-5-oximino-2-methylcyclopentanone-2-acetic acid (0.65g., 54 percent), m.p. 131° – 133°C.

EXAMPLE 16

The acid of Example 15 (0.15 g.), hydroxylamine hydrochloride (0.3 g.) and sodium acetate (0.4 g) were refluxed in methanol (10 ml.) and water (5 ml.) for 2 hours. The methanol was distilled off and the residue was acidified and extracted into ether. The ether solution was extracted with sodium bicarbonate solution, which was then re-acidified and again extracted with ether. The ether was removed and the residue crystallised from aqueous methanol giving 1,5-bisoximino-3-(6'-methoxy-2'-naphthyl)-2-methylcyclopentane-2-acetic acid (0.12 g., 71 percent), m.p. 210°C (dec.).

EXAMPLE 17

Methyl 5-N-methylanilinoformyl-3-(6'-methoxy-2'-naphthyl)-2-methylcyclopentanone-2-acetate (0.44 g.) was dissolved in tetrahydrofuran (15 ml.) and concentrated hydrochloric acid (2.5 ml.) and allowed to stand for 1 hour at 20°C. The tetrahydrofuran was removed in vacuo at 20°C. The oil was dissolved in ether, washed with water and dried with $MgSO_4$. The ether solvent was removed to give methyl 5-formyl-3-(6'-methoxy-2'-naphthyl)-2-methylcyclopentanone-2-acetate (0.28 g., 80 percent) as a gum that would not crystallise from solvents. U.v. (EtOH) λmax. 270 μ (ε 10,000) and (NaOH/EtOH) $\lambda_{max}$ 312μ (ε 11,100).

This ester (10.3 g) was dissolved in N. sodium hydroxide (70 ml.), kept for 3 hours at 20°C, acidified to give an oil, and the oil was dissolved in ether, washed, dried and the solvent removed to give 5-formyl-3-(6'-methoxy-2'-naphthyl)-2-methylcyclopentanone-2-acetic acid as an amorphous tan solid (8.63 g., 87 percent). U.V. (EtoH) $\lambda_{max}$ 270 μ (ε 13,600) and (NaOH-/EtOH) λmax 312 μ (ε 15,800).

Treatment with hydrazine hydrate gave the pyrazole derivative, m.p. 292°C (Found: C, 71.3; H, 6.4; N, 7.94; $C_{20}C_{20}N_2O_3$ requires C, 71.4; H, 6.0; N, 8.33 percent).

What is claimed is:

1. A naphthylcyclopentanone derivative of the formula:

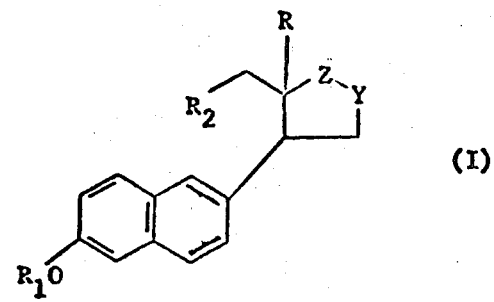

(I)

in which R is methyl;
R₁ is hydrogen or methyl;
R₂ is carboxyl;
Z is CO; and
Y is CH₂.
2. 3-(6'-Methoxy-2'-naphthyl)-2-methylcyclopentanone-2-acetic acid or its methyl ester.
3. The compound of claim 1 which is:
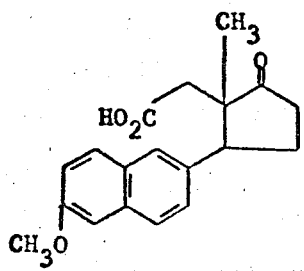
* * * * *